Sept. 14, 1926.
L. E. MEYER
FLOWERPOT SAUCER
Filed May 10, 1923
1,600,055
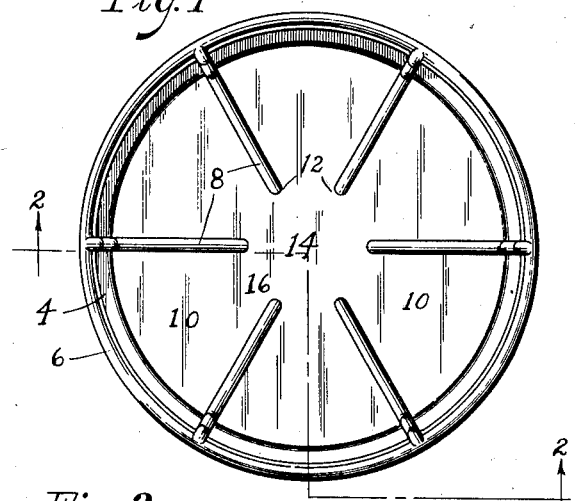
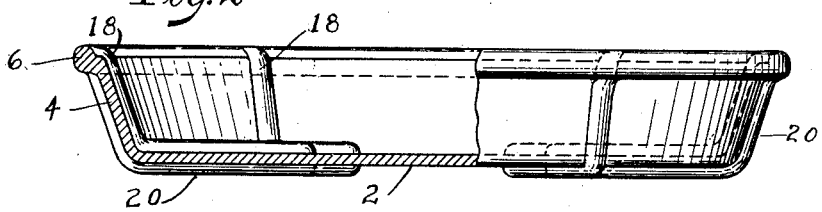
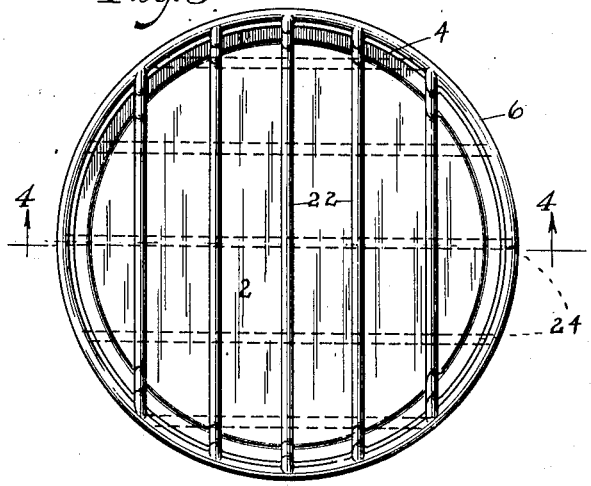
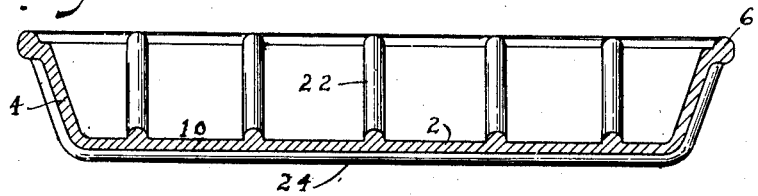
Inventor
Leroy E. Meyer.
By
Atty.

Patented Sept. 14, 1926.

1,600,055

UNITED STATES PATENT OFFICE.

LEROY E. MEYER, OF CUYAHOGA FALLS, OHIO.

FLOWERPOT SAUCER.

Application filed May 10, 1923. Serial No. 638,112.

This invention relates to the manufacture of trays and is herein illustrated in its application to flowerpot saucers. It will be recognized, however, that in many of its aspects the invention is not limited to saucers of that particular type, but is generally applicable to trays of various types.

Flowerpots as ordinarily constructed have the bottoms thereof provided with an aperture or apertures for allowing the water from the flower to escape and for providing ventilation for the roots of the flower. In order to prevent the excess water from soiling the table or other support on which the flowerpot is placed, it is common to provide a tray or saucer to receive the drippings from the pot. However, it has been found that the contact between the bottom of the pot and the upper surface of the saucer is effective to prevent the circulation of air through the ventilating and drainage apertures, and as a result the growth of the flower or plant is hindered. Furthermore, if a flowerpot saucer of ordinary construction is retained in one spot, the surface of the supporting member becomes bleached and disfigured.

It is a general object of the invention to provide a flowerpot saucer which will insure a generous circulation of air between the base of the pot and the saucer. A further object is the provision of a saucer constructed to permit air to freely circulate between the bottom of the saucer and the table or other support.

It is a further object of this invention to provide a saucer molded out of soft rubber, which is durable and flexible, capable of severe usage and will not scratch or mar the table upon which it rests.

These and other features of the invention will appear more fully from the following detailed description when read in connection with the accompanying drawings and will be pointed out in the appended claims.

In the drawings:

Figure 1 is a top plan view of the saucer;

Figure 2 is a side elevation, with a portion broken away along the lines 2—2 of Figure 1;

Figure 3 is a top plan view of a modified form of my invention; and

Figure 4 is a cross-section on the line 4—4 of Figure 3.

The illustrated flowerpot saucer, shown in Figures 1 and 2, comprises a main body portion 2 provided with an upwardly and outwardly flaring rim 4. The rim 4 terminates in an upper edge flange 6. The inner surface of the saucer is provided with a plurality of radially disposed ribs 8 which are spaced apart to provide a plurality of radial passages 10 therebetween. The ribs 8 terminate at points 12 spaced from the center of the saucer, affording a central recess 14 connected with the passages 10 by the openings 16. It will be evident that the flowerpot will be supported by the ribs 8 above the surface of the saucer and that the connected passageways 10 and central opening 14 will afford a perfect and complete circulation of air.

It frequently happens in the use of flowerpot saucers that a pot having a circumference entirely too large for the saucer is forcibly shoved into the saucer. In such instances, the close contact between the outer periphery of the pot and the sides of the saucer will entirely shut off all air from the bottom of the flowerpot. In order to absolutely preclude the possibility of the use of a pot which is too large for the saucer, I extend the radial ribs 8 upwardly on the rim 4 to the upper edge thereof, as shown at 18, 18. From this construction, it will clearly appear that the side ribs 18, 18 will insure the presence of openings between the side of the pot and the saucer to allow free circulation of air at all times.

Upon the outer surface of the saucer, I provide ribs 20 for reinforcing the side rim and bottom of the saucer. These ribs 20 are radially disposed and in alignment with the inside ribs 8. The ribs 20 not only function to reinforce the saucer, but also by the formation of a series of passageways therebetween, accomplish the access of air to the bottom of the saucer. In this manner the tendency of the saucer to stick to its support and probable injury to the support is eliminated.

In the form of the device shown in Figures 3 and 4, the inner ribs 22 are parallel. The outer reinforcing ribs 24 are also arranged in parallelism, and extend in a direction at right angles to the ribs 22.

The flowerpot tray disclosed is preferably made of a rubber compound which can be molded in a single operation to final form. The tray being of soft rubber is comparatively indestructible, will not mar the supporting surface, and can be manufactured at a relatively low cost.

Having described the invention, what I claim as new and desire to secure by Letters Patent of the United States is:

1. As an article of manufacture, a flower-pot tray formed of yielding waterproof material, comprising a base and an upwardly extending rim, a plurality of ribs upon the inner surface of the base to hold the pot in spaced relation thereto to allow the air to circulate under the bottom of the pot, and a plurality of ribs upon the bottom of the tray to elevate the tray above its support, the said ribs being in opposition so that the ribs above and below the tray mutually support one another and the weight of the pot cannot distort the tray.

2. As an article of manufacture, a flower-pot tray comprising a bottom having projections upon its inner surface, and an upwardly extending rim having projections protruding from the inner periphery thereof, the said projections spacing a pot from the bottom and rim of the tray to allow air to circulate freely around the bottom of the pot.

3. As an article of manufacture, a flower-pot tray formed of soft resilient material comprising a base and an upwardly extending rim, a plurality of ribs upon the inner surface of the base and rim to hold a pot in spaced relation thereto and allow the air to circulate under the bottom of the pot, and a plurality of ribs upon the bottom of the tray to reinforce the first named ribs and to elevate the tray above its support.

4. As an article of manufacture, a flower-pot tray formed of soft resilient material and molded to final form, comprising a base and an upwardly extending rim, means on the base for supporting a pot above the base, means on the rim for spacing the pot from the rim, and means upon the outer surface of said tray to reinforce said first named means.

LEROY E. MEYER.